March 2, 1965    G. C. NOLL ETAL    3,171,504
BRAKE AND CLUTCH ASSEMBLY FOR CRAWLER CRANES AND THE LIKE
Filed Aug. 10, 1962    3 Sheets-Sheet 1
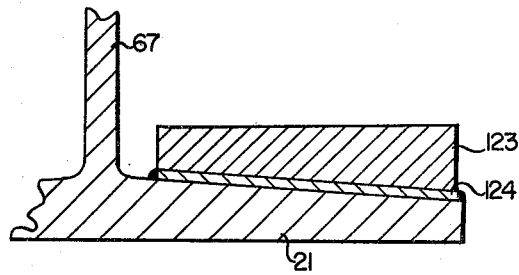
FIG 6
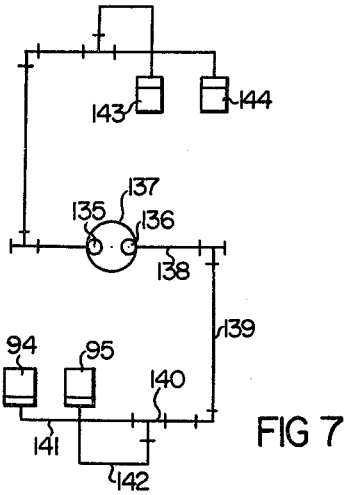
FIG 7
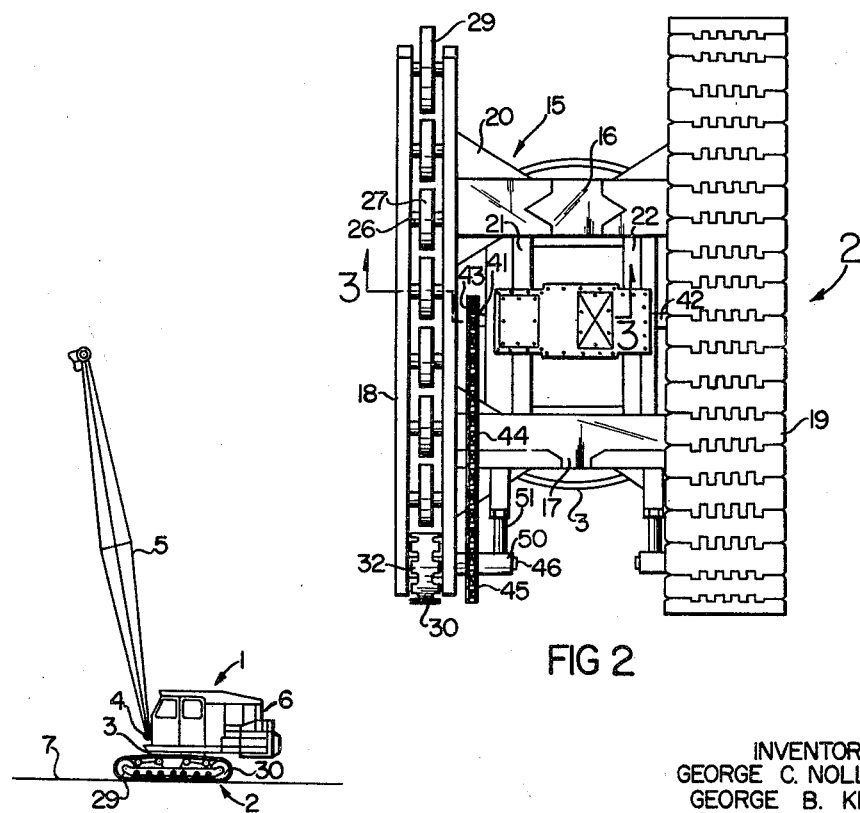
FIG 2
FIG 1
INVENTORS
GEORGE C. NOLL
GEORGE B. KLOS &
PAUL E. WESEBAUM
BY
Oberlin, Maky & Donnelly
ATTORNEYS United States Patent Office 3,171,504
Patented Mar. 2, 1965

3,171,504
BRAKE AND CLUTCH ASSEMBLY FOR CRAWLER
CRANES AND THE LIKE
George C. Noll, George B. Klos, and Paul E. Wesebaum, Elyria, Ohio, assignors, by mesne assignments, to Koehring Company, Milwaukee, Wis., a corporation of Wisconsin
Filed Aug. 10, 1962, Ser. No. 216,169
9 Claims. (Cl. 180—6.58)

This invention relates generally, as indicated, to a brake and clutch assembly for crawler cranes and the like and more particularly to a steering and locking mechanism for the crawler treads of crawler cranes, shovels, and the like.

Crawlers for cranes or shovels are generally propelled by an engine mounted in the crane superstructure which revolves on top of the crawler carrier. Such superstructure is generally mounted on a turntable and the propelling mechanism comprises a vertically extending shaft positioned axially of the turntable geared to a horizontally extending propelling shaft mounted in the carrier frame. The ends of the propelling shaft are connected by means of jaw clutches to stub shafts drivingly engaged with the respective crawler treads at each side of the carrier frame. Steering is generally accomplished by supplying power to one tread only while braking or locking the other tread. Heretofore, the selective locking of the respective tread drives to accomplish the steering and to brake the machine during operation has been accomplished by ratchet and pawl mechanisms which are generally actuated entirely independently of the actuation of the steering jaw clutches.

It is accordingly a principal object of the present invention to provide a positive friction brake for the drives for the crawler treads of a crawler type crane, shovel or the like enabling a more positive steering and providing a positive lock for the crawler when the shovel, crane, or the like is in operation.

A further important object is the provision of a hydraulic clutch and brake assembly which will provide a positive clutch action for the steering of a crawler crane and the like locking the normally driven stub shaft when the steering clutch is released.

A further object is the provision of a friction brake for the drive for crawler treads for power shovels, cranes, and the like controlled by the same mechanisms operating the steering clutches of the crawler carrier.

Yet another object is the provision of a multiplate friction brake which will be positively released as the steering clutch is engaged and vice versa, will be positively engaged as the steering clutch is released.

Still another object is the provision in a crawler carrier for power shovels, cranes and the like of a hydraulically operated clutch and brake assembly employing hydraulic piston-cylinder assemblies to release such brake assemblies while engaging the steering clutches and spring mechanisms to engage the brake when the steering clutches are disengaged.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation of a crawler crane in accordance with the present invention;

FIG. 2 is an enlarged bottom view of the crawler carrier for such crane with one crawler tread removed;

FIG. 6 is an enlarged vertical section taken substantially on the line 6—6 of FIG. 5; and FIG. 7 is a schematic piping diagram of the hydraulic actuating system of the present invention.

Figure 3:
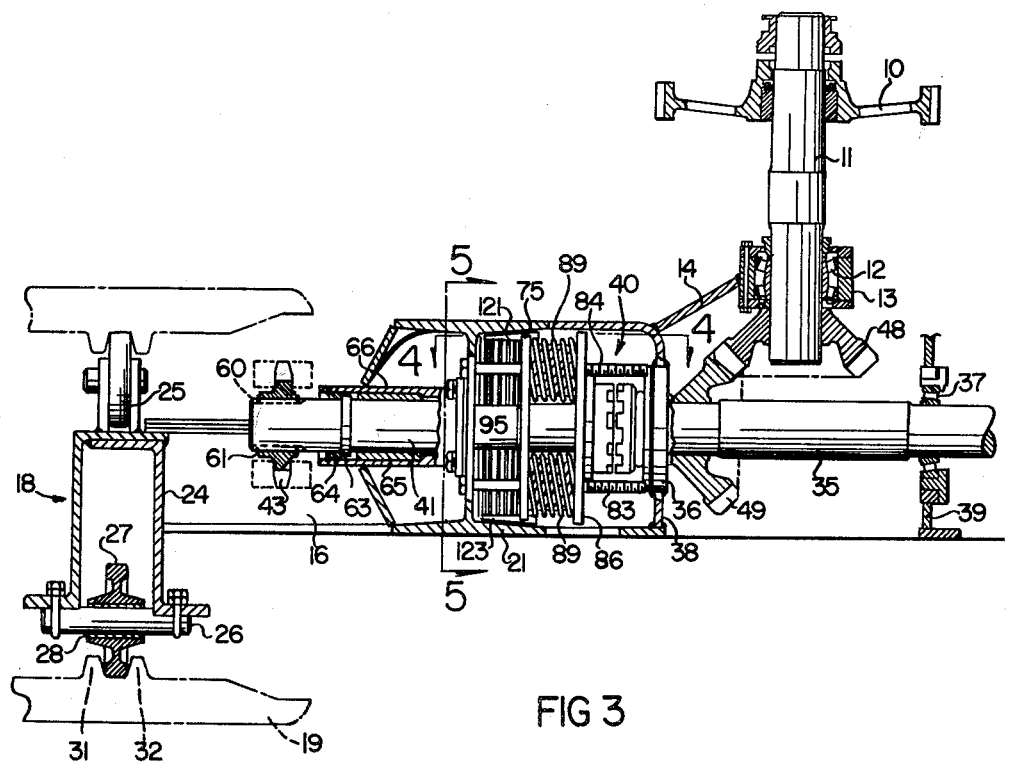
FIG. 3 is an enlarged transverse vertical section partially broken away with parts removed for clarity of illustration taken substantially on the line 3—3 of FIG. 2.

Referring now to the annexed drawings and more particularly to FIG. 1, there is shown a crawler type crane in accordance with the present invention which includes a crane superstructure 1 mounted on a crawler carrier 2 for rotation about the vertical axis of turntable 3. The crane superstructure 1 has pivoted to the front thereof at the boom foot 4 an operating boom 5 which may be employed with a clamshell hoisting mechanism, a drag line, or other type lifting mechanism. In place of the boom 5, a shovel or back hoe attachment may readily be substituted. A prime mover in compartment 6 may be employed to operate the hoisting drum for elevation of the boom 5 and the load carried thereby and also the drive of the crawler carrier 2 so that the machine may be propelled over the ground 7.

Referring now additionally to FIGS. 2 and 3, the shifting of a jaw clutch on a turntable travel shaft will engage the crawler carrier drive which includes a pinion (not shown) in meshing engagement with the gear 10 mounted on the vertically extending travel shaft 11 extending coaxially through the turntable 3. Such vertical shaft 11 may be mounted in special tapered roller bearings 12 secured in housing 13 mounted on the top frame plate 14 of the carrier carbody shown generally at 15 in FIG. 2. The carbody 15 comprises two major transverse beams 16 and 17 which interconnect the two carrier side frames 18 on which the respective crawler treads 19 are mounted. Gusset plates or the like 20 may be provided rigidifying the structure and longitudinally extending beams 21 and 22 may be provided interconnecting the transverse beams 16 and 17 providing a rigid center box-like frame for the crawler propelling mechanism.

The carrier side frames 18 each include a box-like frame structure 24 which has mounted on the top thereof the idler rollers 25. The open bottom of the frame 24 is provided with a series of transverse stub shafts 26 with the weight supporting idler rollers 27 being rotatably mounted thereon with bushings 28 or other suitable anti-friction means being provided. The front of the side frames is provided with the end roller 29 and the rear of the frames is provided with the drive sprocket 30. The treads 19 are provided with a central interior track formed by the upstanding projections 31 and 32 on each of the hingedly interconnected tread plates which fit on either side of the idler rollers 25, 27 and the end idler roller 29. However, these projections engage between specially formed laterally projecting teeth 33 in the sprocket 30 that the crawler treads may be driven thereby.

Drive from the vertically extending travel shaft 11 to the treads is effected through a horizontal propelling shaft 35 mounted in tapered roller bearings 36 and 37 in the plates 38 and 39 respectively of the central box frame. On each end of the propelling shaft, there is provided a sliding jaw-type steering clutch 40 (only one being shown in FIG. 3) which connects the ends of such propelling shaft to coaxially mounted drive stub shafts 41 and 42. These shafts which project through the longitudinally extending beams 21 and 22 are provided with drive sprockets 43 on their projecting ends about which are trained heavy-duty drive chains 44 which are also trained about driven sprockets 45 mounted on the shafts 46 of the tread drive sprockets 32. In this manner, when the steering jaw clutches are engaged, the drive from the vertically extending travel shaft 11 to the horizontal propelling shaft through the bevel gears 48 and 49 is effective to rotate the drive sprockets 43 to drive the chains 44 to drive the treads 19. The inwardly projecting ends of each shaft 46 may be mounted in collar 50 supported by adjustable rod 51 properly supporting the shaft 46 and maintaining the proper tension of chain 44. A bottom cover plate will normally be provided bridging the plates 38 and 39 so that the gears 48 and 49 may be immersed in an oil bath. To facilitate this bath, special seals may be provided for the propelling shaft 35 projecting through the housing plates 38 and 39.

Figure 4:
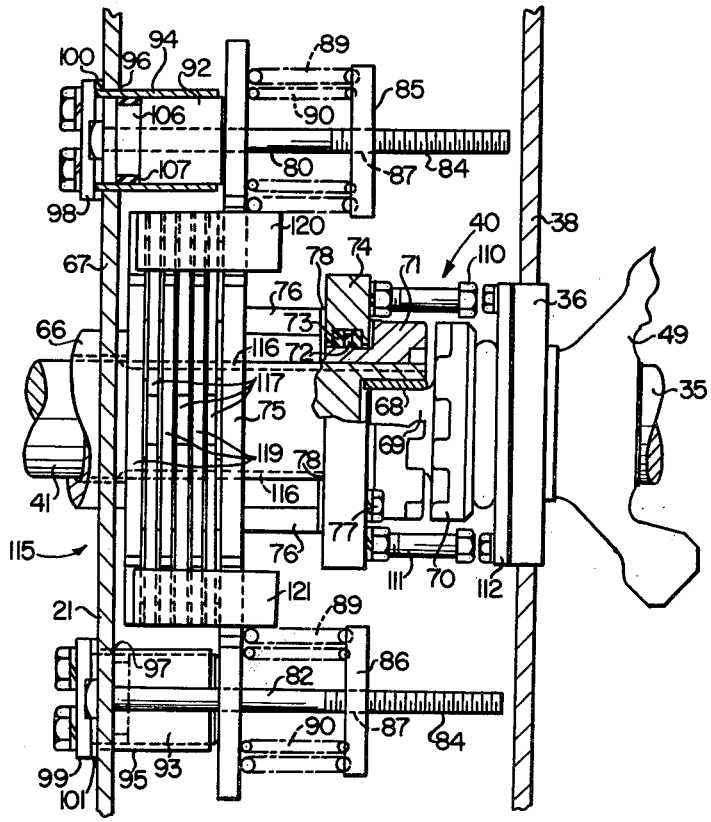
FIG. 4 is a fragmentary enlarged horizontal section taken substantially on the line 4—4 of FIG. 3.
Figure 5:
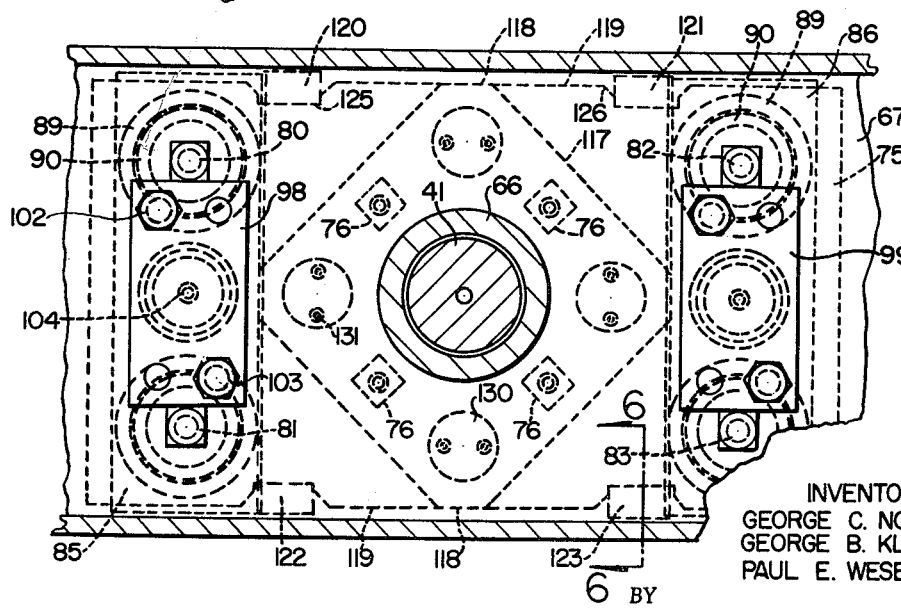
FIG. 5 is an enlarged vertical section taken substantially on the line 5—5 of FIG. 3.

Referring now particularly to FIGS. 3, 4 and 5, it will be seen that the projecting shaft 41 is provided with splines 60 so that the sprocket 43 is splined to the end of such shaft and snap or lock rings 61 may be employed to maintain the sprocket properly axially positioned on such shaft. The shaft 41 is provided with an annular shoulder 63 and bushings 64 and 65 support such shaft for rotation on opposite sides of such shoulder within sleeve 66 which surrounds the shaft 41 and projects through the web 67 of the beam 21. The shaft 41 is supported for rotation at its inner end by means of the bushing 68 surrounding the projecting portion 69 of the propelling shaft 35 which projects through the jaw clutch element 70. Accordingly the shaft 41 is internally supported at its inner end and externally supported at its outer end. A sliding jaw clutch element 71 is splined to the inner end of the shaft 41 having teeth thereon adapted to mate with the teeth of the jaw clutch element 70 splined to the outer end of the propelling shaft 35. The jaw clutch element 71 is freely longitudinally movable along the shaft 41 due to the spline fit thereon and is provided with an annular flange or projection 72 having split thrust washers 73 on both sides thereof. Enclosing the thrust washers there is provided a split collar 74 which is accordingly locked for longitudinal movement with the jaw element 71. The split collar 74 which is secured to the jaw clutch element 71 is in turn secured to a spring base plate 75 by four support members 76 fastened by elongated screws 77. Shims or the like 78 may be provided between the support members and the split collar 74. In this manner, the spring base plate 75 is mounted for movement with the split collar 74 and thus the jaw clutch element 71. The spring base plate 75 extends longitudinally of the beam 21 parallel to the web 67 and fits closely to the top and bottom flanges of such beam.

Four elongated studs 80, 81, 82 and 83 extend through the spring base plate 75 and through the web 67 of the beam 21. These studs extend freely through the base plate 75 so that the plate 75 may move with respect to such studs. The outer ends of the studs are threaded as shown at 84 in FIG. 4 and two vertically elongated spring backing plates 85 and 86 are provided on each side of the drive shaft having tapped openings 87 and two of such studs are thereby threadedly secured in each backing plate. Rotation of the studs 82 will, of course, provide an adjustment for the spring backing plates 85 and 86 and adjustment of the pressure obtained by the four pairs of springs 89 and 90 surrounding each stud 80 through 83 with the spring 90 being coaxially disposed within the spring 89 of each pair. The springs then extend from the spring base plate 75 to the two spring backing plates 85 and 86 and the pressure exerted by such springs tends to move the spring base plates 75 to the left as seen in FIG. 4. This spring pressure also, of course, tends to move the split collar 74 and the jaw clutch element 71 to the left as seen in FIG. 4 disengaging the steering clutch 40.

Opposing the pressure of the springs 89 and 90 are two pistons 92 and 93 engaging the opposite side of the spring base plate 75 and disposed within cylinders 94 and 95 respectively fitted within openings 96 and 97 in the web 67 of the beam 21. The ends of the cylinders projecting through the beam web 67 are closed by cylinder base plates 98 and 99 and suitable gaskets 100 and 101 are employed to provide the proper seal for the blind end of the cylinders. Such cylinder base plates are fastened to the beam web 67 by two screws each shown at 102 and 103. Each cylinder base plate may be provided with a tapped opening 104 for connection of an elbow of the hydraulic piping system.

As seen more clearly at the top of FIG. 4, each piston 92 and 93 is provided with a shoulder 106 and packings 107 may be interposed between the shoulder and the wall of the cylinder.

It can now be seen that hydraulic pressure within the cylinders 94 and 95 will move the pistons to the right as seen in FIG. 4 moving the cylinder base plate also to the right compressing springs 89 and 90 and moving the split collar 74 and thus the jaw element 71 into engagement with the jaw element 70 of the steering clutch 40.

Travel of the pistons, the spring base plates 75, the split collar 74, and the jaw clutch element 71 is limited by stop screws 110 and 111 mounted on the split collar 74 which may be adjusted to engage the cover plate 112 of the bearing 36. To make the proper adjustment for the illustrated embodiment, the shims 78 may be removed or added between the members 76 and the split collar 74 to obtain ⅛ inch plus or minus ¹⁄₃₂ inch clearance between the jaw clutches. When the proper clearance is thus obtained, the stop screws are set at ¹¹⁄₁₆ inch clearance between the heads and the cover plate 112.

It can now be seen that there is provided the steering clutch operated by the hydraulic piston-cylinder assemblies which will drive the jaw clutch elements into proper engagement and when the hydraulic pressure is relieved, the four sets of compression springs 89 and 90 will positively disengage the steering clutch. When the steering clutch is disengaged, it is desirable to have the tread driven by the particular clutch locked against movement. When steering the crane carrier, the disengaged tread has to be locked in order to turn the crawler and when no power is transmitted to the crawler tread during a digging or working operation, it is also desirable to have the tread locked against movement in that considerable force in backhoe, shoveling or clamshell line operations can be obtained upon the machine which would tend to move the machine over the ground. To provide the automatic locking of the tread when the steering clutch is disengaged, there is provided the plate brake assembly shown generally at 115. As seen in FIG. 4, the splines 116 on the inner end of the shaft 41 extend almost to the web 67 of the beam 21. These splines on which the jaw clutch element 71 is slidably mounted also serve to secure for rotation with the shaft 41 three brake plates 117, all identical in form. The outline of these plates may be seen in dotted line in FIG. 5 and they are substantially square with flattened corners as indicated at 118. These three plates are slidably secured to the splines 116 of the shaft 41 and, of course, rotate therewith. Alternating with the rotating brake plates 117 are brake plates 119 held against rotation by four key members 120, 121, 122 and 123 which are secured to the top and bottom flanges of the beam 21. The key members are provided with a bottom sloping face which may be shimmed up by a spacer 124 with both the key element and the spacer being welded or otherwise suitably secured to the beam flange. The non-rotating brake plates 119 are provided with cut-out corners as indicated at 125 with the sharp outer edge of the cut-out portion being beveled as shown at 126. The spring base plate 75 may similarly be recessed along its top and bottom edges to receive the keys 120 through 123. The outer stationary plate 119 butts up against the sleeve 66 and may be secured thereto. In any event, the shaft 41 will extend freely through the stationary plates 119. If the spring base plate 75 is counted as a stationary plate, it will be seen that the three rotating plates 117 have non-rotating brake plates on each side thereof. Circular friction plates 130 may be secured to the opposite sides of the interior stationary plates 119 and to the insides of the outer stationary plate and the spring base plate 75 by suitable fasteners such as the flat head rivets shown at 131. In this manner, for one complete brake assembly, twenty-four such circular friction plates are required. It can now be seen that the shaft 41 has stacked thereon four stationary plates, three plates 119 and one plate 75 and three rotating brake plates 117 interposed therebetween. When the hydraulic cylinders extend the spring base plate 75 to engage the clutch 40, the brake will be released, but when the hydraulic fluid pressure is relieved and the springs 89 and 90 disengage the clutch 40, they will also drive the brake plates into frictional engagement with each other locking the shaft 41 against rotation and accordingly the treads driven thereby.

It will be understood that the shaft 42 driving the opposite tread 19 will be similarly connected to the horizontal propelling shaft 35 so that either tread of the crawler may selectively be driven one at a time for steering or both for propelling the crawler carrier. When the steering clutches 40 for each shaft 41 and 42 are disengaged, the brake mechanism illustrated will lock the respective shafts and, of course, the respective crawler treads against movement.

As seen in FIG. 7, the hydraulic fluid for the piston-cylinder assemblies may be provided through two vertically extending conduits 135 and 136 extending through a rotary seal 137 positioned at the centerline of rotation of the turntable 3. The vertically extending shaft 11 normally will be hollow and such conduits 135 and 136 will extend therethrough from the hydraulic system in the crane superstructure 1 to the respective hydraulic cylinders. From the rotary seal, the conduit 136 connects with piping 138 and 139 with a T 140 being provided from which hydraulic hoses 141 and 142 are connected to the hydraulic cylinders 94 and 95, respectively. The conduit 135 may similarly be connected to the hydraulic cylinders 143 and 144 operating the clutch and brake assembly for the shaft 42. In this manner, the operator's cab need be provided only with two valves for the conduits 135 and 136 enabling the selective driving engagement to the crawler treads 19 and when the steering clutches are disengaged, the treads will automatically be frictionally locked against movement by the brake assemblies shown.

Other modes of applying the principle of the invention may be employed, change being made as regards the details described, provided the features stated in any of the following claims or the equivalent of such be employed.

We, therefore, particularly point out and distinctly claim as our invention:

1. In combination, a crawler for a crane, shovel or the like, having endless ground engaging treads on opposite sides thereof, a turntable mounted on said crawler, a rotating superstructure mounted on said turntable, a vertically extending travel shaft adapted to be driven by a prime mover in said superstructure, a horizontal propelling shaft in said crawler driven by said travel shaft, selectively operable steering clutch means drivingly connecting the ends of said propelling shaft to said endless treads, hydraulic piston-cylinder means connected to and operative to engage said clutch means to effect a drive to a selected one of said endless treads, spring means connected to said clutch means operative to disengage said clutch means on release of the hydraulic pressure in said piston-cylinder means, friction brake means operatively connected to said spring means operative automatically in response to disengagement of said clutch means to lock said selected endless tread against movement; and a drive shaft for each of said endless treads coaxially aligned with said propelling shaft, said friction brake means comprising a plurality of rotating brake plates axially slidably mounted on said drive shaft, a plurality of non-rotating brake plates interposed between said rotating brake plates and also axially slidably mounted with respect to said drive shaft, said spring means compressing said non-rotating brake plates against said rotating brake plates to lock the drive shaft of said selected endless tread against rotation.

2. The combination set forth in claim 1 wherein one of said non-rotating brake plates comprises a spring base plate, said piston-cylinder means acting on one side of said spring base plate to move said spring base plate against the pressure of said spring means which act on the opposite side of said spring base plate.

3. The combination set forth in claim 2 wherein said steering clutch means includes relatively movable jaw elements, one of said elements being connected to said spring base plate for movement therewith, said hydraulic piston-cylinder means moving said spring base plate and thus said one jaw element into clutch engagement while simultaneously separating said brake plates to release the drive shaft of the selected endless tread.

4. In combination, a crawler for cranes, shovels, and the like having endless ground engaging treads on opposite sides thereof, a crawler frame interconnecting said ground engaging treads, a turntable mounted on said crawler frame, a rotating superstructure mounted on said turntable, a horizontal propelling shaft mounted in said crawler frame adapted to be driven by a prime mover in said superstructure, drive shafts for each of said endless treads mounted in said crawler frame axially aligned with said propelling shaft, steering jaw clutch means interconnecting the ends of said propelling shaft and the respective drive shafts, said crawler frame comprising longitudinally extending I-beams, said drive shafts extending transversely through the webs of said I-beams, key elements secured to the flanges of said I-beams, a plurality of non-rotating brake plates held against rotation by said key elements surrounding said drive shafts and axially slidable with respect thereto, a plurality of rotating brake plates axially slidably mounted on said drive shafts interposed between said non-rotating brake plates, movable base plates operatively associated with said brake plates extending transversely of said drive shafts and connected to one of the jaw elements of each said steering clutch means, movement of said base plates in one direction engaging said steering jaw clutch means while simultaneously permitting separation of the associated brake plates to release the respective drive shaft, movement of the base plates in the opposite direction disengaging said clutch means and engaging the associated brake plates.

5. The combination set forth in claim 4 including hydraulic piston-cylinder means operative to move said base plates in said one direction and thus said jaw elements into engagement.

6. The combination set forth in claim 4 including spring means operative to move said base plates in said opposite direction and thus said jaw elements out of engagement.

7. The combination set forth in claim 4 including hydraulic piston-cylinder means on one side of each said base plate operative to move said base plate to separate the associated brake plates and to engage said steering clutch jaw element, spring means on the opposite side of each said base plate operative to resist such movement by said hydraulic piston-cylinder means and upon release of the fluid pressure in said hydraulic piston-cylinder means to move said jaw element out of engagement and to compress the associated brake plates locking the respective drive shaft against rotation.

8. The combination set forth in claim 7 wherein said spring means for each drive shaft comprises four pairs of concentric compression springs, two of said pairs being disposed on opposite sides of said shaft and adjacent said piston-cylinder means.

9. The combination set forth in claim 8 wherein said piston-cylinder means comprises two piston-cylinder assemblies for each drive shaft, one on each side thereof, said two pairs of springs being disposed on opposite sides of each piston-cylinder assembly.

References Cited in the file of this patent
UNITED STATES PATENTS

| | | |
|---|---|---|
| 1,053,918 | Meyer | Feb. 18, 1913 |
| 1,238,702 | Welch | Aug. 28, 1917 |
| 2,320,320 | Brey | May 25, 1943 |